United States Patent
Kwun et al.

(10) Patent No.: US 6,212,944 B1
(45) Date of Patent: *Apr. 10, 2001

(54) APPARATUS AND METHOD FOR MONITORING ENGINE CONDITIONS, USING MAGNETOSTRICTIVE SENSORS

(75) Inventors: Hegeon Kwun; Cecil M. Teller; Roy C. Meyer; Kendall R. Swenson, all of San Antonio, TX (US)

(73) Assignee: Southwest Research Institute, San Antonio, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,119

(22) Filed: Feb. 28, 1997

Related U.S. Application Data

(63) Continuation of application No. 08/640,252, filed on Apr. 30, 1996, which is a continuation of application No. 08/509,750, filed on Aug. 3, 1995, which is a continuation of application No. 08/226,879, filed on Apr. 13, 1994.

(51) Int. Cl.$^7$ ................................................. G01M 15/00
(52) U.S. Cl. ........................ 73/116; 73/DIG. 2; 73/35.07
(58) Field of Search .......................... 73/115, 116, 117.2, 73/117.3, DIG. 2, 35.01, 35.03, 35.06, 35.07, 35.09, 35.12

(56) References Cited

U.S. PATENT DOCUMENTS

| | | |
|---|---|---|
| 2,534,276 | 12/1950 | Lancor, Jr. ................................. 73/35 |
| 4,106,447 | 8/1978 | West ....................................... 123/117 |
| 4,161,665 * | 7/1979 | Buck et al. ......................... 73/DIG. 2 |
| 4,290,301 * | 9/1981 | Yamaguchi et al. ................. 73/35 M |
| 4,366,702 * | 1/1983 | Yamaguchi et al. ................. 73/35 M |
| 4,408,483 * | 10/1983 | Bollinger et al. .................... 73/117.3 |
| 4,408,496 | 10/1983 | Dahle ....................................... 73/728 |
| 4,409,816 * | 10/1983 | Yamaguchi et al. ............... 73/350 M |
| 4,463,610 | 8/1984 | Anderson, III .......................... 73/654 |
| 4,586,369 * | 5/1986 | Vogler ................................... 73/117.3 |
| 4,643,023 * | 2/1987 | Capps .................................... 73/117.3 |
| 4,736,620 * | 4/1988 | Adolph .............................. 73/DIG. 2 |
| 4,823,621 * | 4/1989 | Sobel et al. ....................... 73/DIG. 2 |
| 5,119,783 * | 6/1992 | Komuraski ............................ 73/117.3 |
| 5,179,857 * | 1/1993 | Sonderegger et al. .............. 73/117.3 |

* cited by examiner

Primary Examiner—George Dombroske

(57) ABSTRACT

A method and apparatus is provided for the sensing, collection, and analysis of information on combustive and mechanical events occurring within an operating internal combustion engine through the measurement of mechanical stress waves present within the engine. The system includes a magnetostrictive sensor placed in mechanical compliance with the engine, preferably the engine block, which detects and translates stress waves into an electrical signal that is filtered and amplified for recording and/or for analysis. Information regarding the frequency, amplitude, and timing changes within the signal is utilized to characterize the ordinary operation of the engine and to identify anomalous events. The system includes a means for maintaining a signal record and comparing signal features with past records for a particular engine or with standard signal features associated generally with certain engine events. The system apparatus can be implemented in a laboratory or technical setting or may be configured as an on-board monitoring system with correctional feedback capabilities.

7 Claims, 4 Drawing Sheets

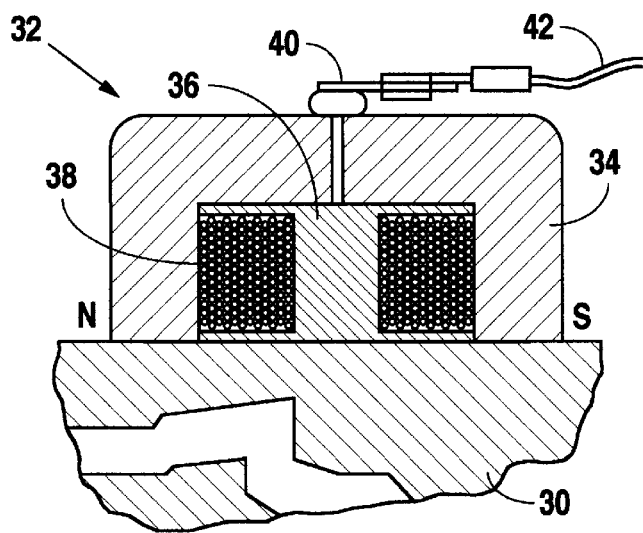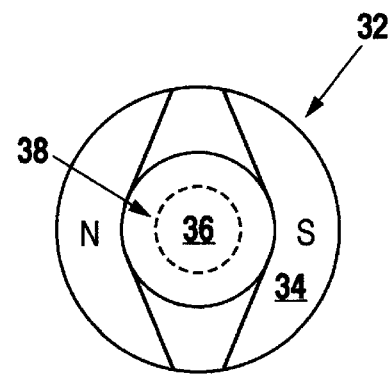
Fig. 2a    Fig. 2b
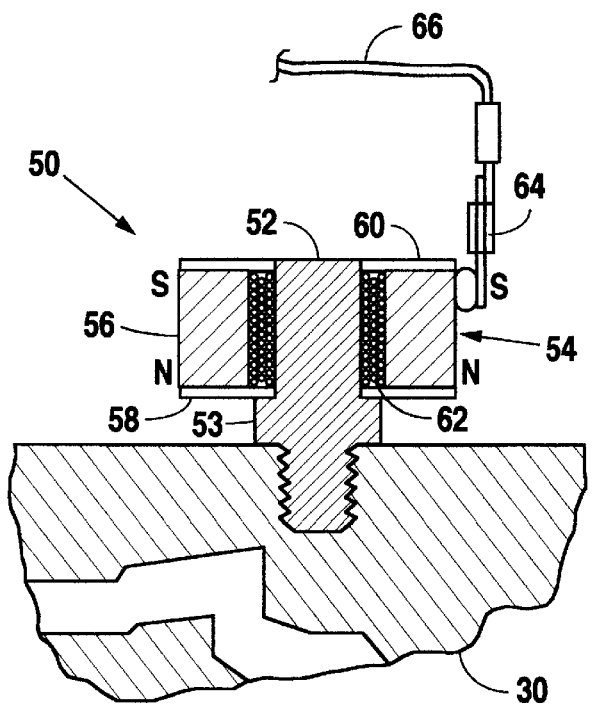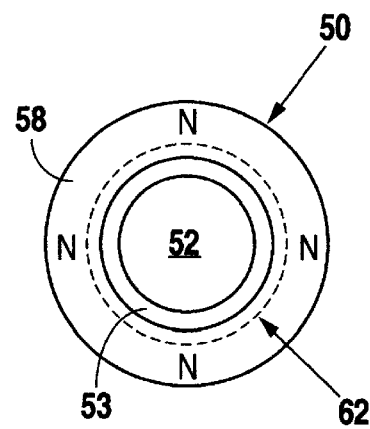
Fig. 3a    Fig. 3b

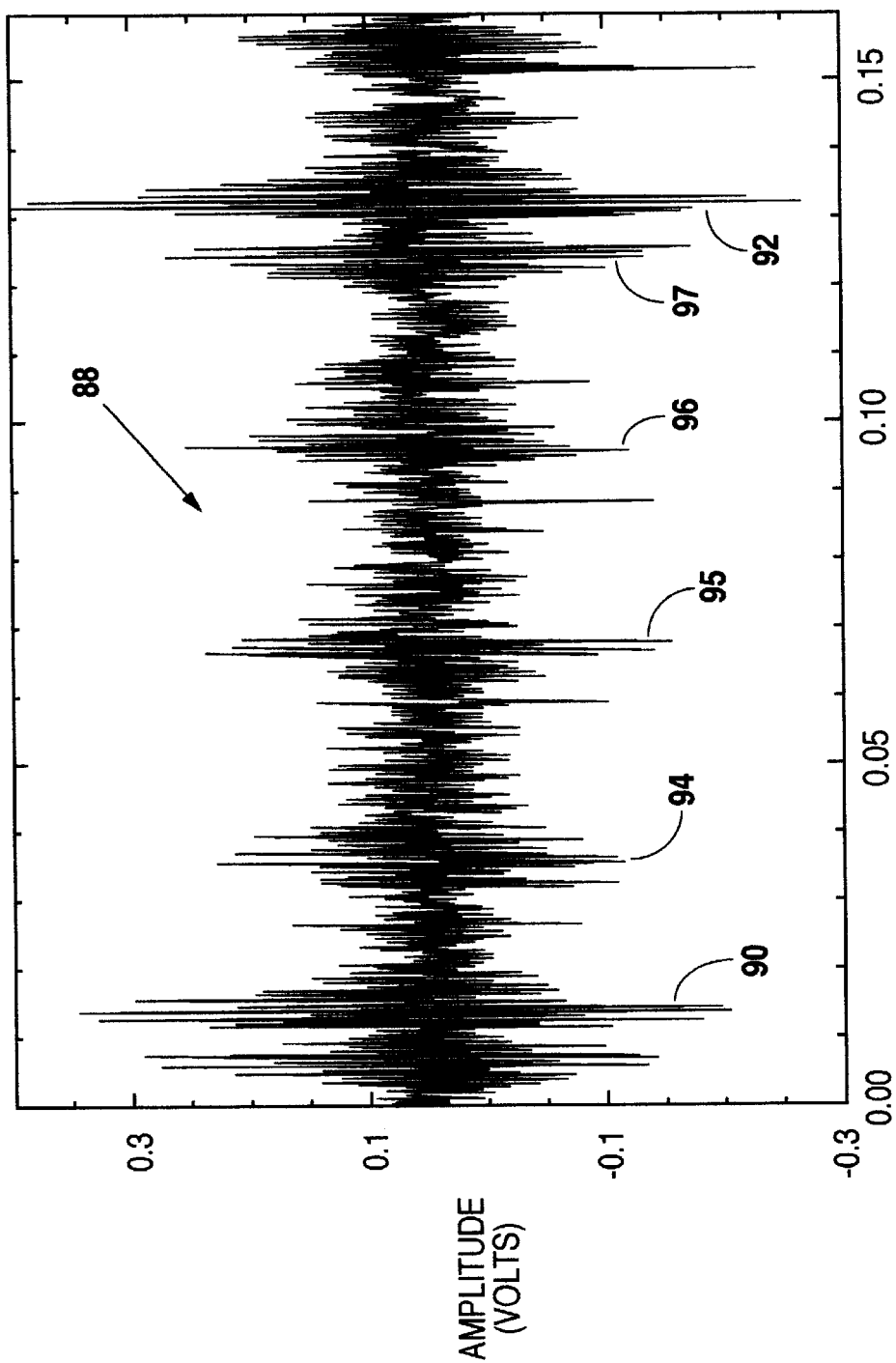

APPARATUS AND METHOD FOR MONITORING ENGINE CONDITIONS, USING MAGNETOSTRICTIVE SENSORS

This is a Continuation of copending application Ser. No. 08/226,879, filed on Apr. 13, 1994. This is a Continuation of copending application Ser. No. 08/509,750, filed on Aug. 3, 1995. This is a Continuation-in-part of copending application Ser. No. 08/640,252, filed on Apr. 30, 1996.

BACKGROUND OF THE INVENTION

I. Field of the Invention

The present invention relates generally to methods and devices for the monitoring, measuring, and evaluation of internal combustion engine operation. The present invention relates more specifically to a method and apparatus for sensing, measuring, and analyzing the operation of an internal combustion engine by detecting mechanical stress pulses created by both the combustion process and the mechanical action and interaction of the engine elements. The present invention in particular applies to both a one-time, non-destructive evaluation of engine deterioration and an on-going, on-board, monitoring of engine operation.

II. Description of the Prior Art

Information regarding the operation and condition of internal combustion engines is desirable and important from two standpoints. First, the designs of internal combustion engines are constantly being refined to improve efficiency and output. Factors which affect efficiency and output are sometimes difficult to control, measure, and analyze, especially during the operation of the engine combustion cycle. If detailed information on the timing of combustive events, the operation of the mechanical components, and the combustion characteristics, could be obtained then a much more thorough efficiency and condition analysis could be achieved. From a second standpoint, assuming some internal combustion engine of optimal efficiency and output, the inevitable and on-going deterioration of the engine and its effect on the efficiency and output, is of great importance. If information could be gathered and analyzed on a continuous basis, many deteriorating actions and effects within an engine could be detected as it operates and, in some cases, compensated for or brought to the attention of the engine operator in advance of significant detrimental effects on the operation of the engine.

A more thorough knowledge and understanding, therefore, of the activities and occurrences within an internal combustion engine would help lead to not only improved engine designs but also to the better use and operation of existing engine designs. Efforts thus far in the field to obtain relevant information on the operation of the internal combustion process have been limited to somewhat gross measurements of temperatures and pressures within the engine. Typically, as for example in an automotive engine, lubricant pressure and temperature, coolant temperature, and combustion cycle timing, have been the extent of the monitoring. In more refined applications, analysis of exhaust gases, spark plug firings, and periodic wear measurements have provided additional bits of information from which to discern and describe the function and efficiency of the engine. On the whole, however, very little has been done in the field to obtain the much-needed, yet more difficult to obtain, information associated with the operation of the mechanical elements and the combustion of the fuel within the engine. This is not surprising, since the environment within and about an internal combustion engine is not conducive to the sensitive types of sensors that are normally required to obtain the more detailed information about engine performance. Combine this problem with the higher costs associated with the more refined sensors, and it is easy to understand why little effort has been made to acquire additional details about engine operation along these lines.

As indicated above, well-known parameters that can and have been measured for engine operation include various temperatures and pressures whose values are obtained through thermocouple-based sensors or more rugged but less sensitive pressure transducers. Since the operational temperatures and pressures within an engine are an indication of its efficiency and can ultimately be an indication of problems occurring in the engine, these parameters are quite important but somewhat limited in the information they convey. More often than not, changes in temperature and pressure parameters merely indicate the presence of a problem or an operational inefficiency and do nothing to suggest where that problem might be occurring or what the basis of an inefficiency is.

More sensitive types of transducers have been utilized in the laboratory to analyze engine conditions but very little of this laboratory analysis has been translated into an on-board operational analysis or monitoring. In the laboratory, piezoelectric transducers have been able to detect, monitor and assist in the analysis of not only pressure characteristics (and when operated in conjunction with thermocouples, temperature characteristics) but also the mechanical interaction of the components of the engine itself. Piezoelectric transducers can be configured to measure pressures within the combustion chambers, the lubricant system, and may also be used to localize mechanical events in a manner that allows some indication of their general location. Piezoelectric transducers, however, though rugged for many applications, are still far too delicate to be utilized for long periods of time in association with the high operating temperature and vibrational effects within and about internal combustion engines. In addition, the ability of piezoelectric transducers to finely distinguish vibrations and waves that might be associated with anomalous events and/or ordinary events in the operation of an engine is quite limited.

It would, therefore, be advantageous to develop an apparatus and method for detecting, measuring, and analyzing conditions within an internal combustion engine with a sensitivity that allows a more thorough understanding of not only ordinary operational events but also any anomalous events within the engine that might occur over short or long periods of time. It would be desirable to have such a system that could, on the one hand, function in an analytical setting where the then existing condition of an engine could be determined and characterized. On the other hand it would also be advantageous if such an apparatus and method could be implemented in a monitoring mode whereby information on the on-going, long-term operation of an engine could be collected and retained for either later analysis or for continuous comparison with threshold values that might signal problems. Further, it would be advantageous to have such a method and apparatus that would permit feedback compensation for events where such compensation can be shown appropriate and where the event is a modifiable occurrence.

Some use of more recent sensor technology and devices such as magnetostrictive sensors has been shown in other fields to provide sensitive means for mechanical stress wave measurement in both metallic and non-metallic structures and machines. Some application of these magnetostrictive devices has been made in the field of internal combustion engines and might be typified by the following:

U.S. Pat. No. 4,736,620 issued to Adolph on Apr. 12, 1988, entitled, "Magnetostrictive Element for Measuring Knocking Engines," describes the use of a magnetostrictive element to detect self-ignition or "knocking" in the combustion cycle. A number of sensor devices are connected by way of mechanical wave guides (wires) to each of the individual combustion chambers within an engine. The ability of these devices to gather information, however, is strictly limited to the detection of knocking within a specific cylinder and over all does not lend itself to easy installation on existing engines or, for that matter, versatility in its ability to characterize any engine events other than the occurrence of combustion.

U.S. Pat. No. 4,463,610 issued to Anderson III, et al on Aug. 7, 1984, entitled "Tuned Vibration Detector," describes a sensor for detecting engine knock that incorporates a tuning mechanism mechanically resonant with a preselected vibrational frequency. The effects of engine knock on the tuning network in the Anderson device indicate the varying applied stress. The limitations described above with respect to the Adolph patent, however, likewise apply herein, insofar as little more than a detection of engine knock as an event is possible with such a sensor.

U.S. Pat. No. 2,534,276 issued to Lancor on Dec. 19, 1950, entitled "Vibration Pick-up Device and System," describes an early magnetostrictive-type vibration sensor utilized to detect impact, shock, or detonation, and which functions much like an accelerometer. This device is mounted in an engine's cylinder wall. Here again, the device is limited in that it isolates only what goes on in a single combustion cylinder and, even then, gathers information relevant only to the occurrence of a combustive event, and little more.

While the above patents represent that some effort has been made to utilize magnetostrictive-type sensors in engine analysis, it is clear that such uses to date have been quite limited. These limitations derive from the fact that the sensor structures and methods disclosed heretofore are unable to isolate and interpret anything other than the gross occurrence of a combustion event. The fact that efforts in the past have resorted only to identifying combustive events and their relative time spacing, and that these sensors must be associated with specific individual combustion chambers, indicates that little more information can be obtained under the constraints placed on them.

III. Background on the Magnetostrictive Effect

The magnetostrictive effect is a property peculiar to ferromagnetic materials. The magnetostrictive effect refers to the phenomena of physical, dimensional change associated with variations in magnetization. The effect is widely used to make vibrating elements for such things as sonar transducers, hydrophones, and magnetostrictive delay lines for electric signals. The magnetostrictive effect actually describes physical/magnetic interactions that can occur in two directions. The Villari effect occurs when stress waves or mechanical waves within a ferromagnetic material cause abrupt, local dimensional changes in the material which, when they occur within an established magnetic field, can generate a magnetic flux change detectible by a receiving coil in the vicinity. The Joule effect, being the reverse of the Villari effect, occurs when a changing magnetic flux induces a mechanical vibrational motion in a ferromagnetic material through the generation of a mechanical wave or stress wave. Typically, the Joule effect is achieved by passing a current of varying magnitude through a coil placed within a static magnetic field thereby modifying the magnetic field and imparting mechanical waves into a ferromagnetic material present in that field. These mechanical or stress waves then propagate not only through the portion of the ferromagnetic material adjacent to the generating coil but also into and through any further materials in mechanical contact with the ferromagnetic material. In this way, non-ferromagnetic materials can serve as conduits for the mechanical waves or stress waves that can thereafter be measured by directing them through these ferromagnetic "wave guides" placed proximate to the magnetostrictive sensor element.

The advantages of magnetostrictive sensors over other types of vibrational sensors becomes quite clear when the structure of such sensors is described. All of the components typically utilized in magnetostrictive sensors are temperature, pressure, and environment-resistant in ways that many other types of sensors, such as piezoelectric based sensors, are not. High temperature, permanent magnets, magnetic coils, and ferromagnetic materials are quite easy to produce in a variety of configurations. Further, although evidence from the previous applications of magnetostrictive sensors would indicate the contrary, magnetostrictive sensors are capable of detecting mechanical waves and translating them into signals that are subject to very fine analysis and discrimination in a manner that allows information to be obtained from the elements in an engine that have initially generated the stress.

SUMMARY OF THE INVENTION

It is therefore an object of the present invention to provide an apparatus and method for the evaluation of internal combustion engine operational characteristics.

It is another object of the present invention to provide an apparatus and method for a long-term monitoring of the operational characteristics of an internal combustion engine.

It is another object of the present invention to provide an apparatus and method for the collection and analysis of information regarding combustion characteristics, and mechanical element interaction within an internal combustion engine and the use of that information to detect inefficiencies in the operation of the engine and to identify anomalous events that indicate the deterioration of the engine, or potentially damaging phenomena such as pre-ignition and detonation, further facilitating either immediate compensation and correction of such effects or the signaling of engine problems to an engine operator.

In fulfillment of these and other objectives, the present invention provides a method and apparatus for utilizing a magnetostrictive sensor positioned in mechanical/acoustic contact with the engine block or engine head of an internal combustion engine. The sensor is capable of translating stress and mechanical waves that may be received through the engine block into an electrical signal whose frequency, amplitude, and timing characteristics are indicative of both ordinary and anomalous events in the combustion, operation, and interaction of elements in the engine. The present invention provides a means for associating the signal generated by the magnetostrictive sensor with known engine timing sequences and engine component characteristics. The present invention permits the comparison of an initial signal signature with subsequent signatures derived over a period of time after deteriorating effects have occurred within the engine. In addition, the present invention provides a means for identifying signal patterns and characterizing them as having been generated by specific anomalous events that have been previously characterized. Such event recognition is utilized in the present invention to not only facilitate an analysis of the engine and its efficiency and output at any given time but also to signal, in an alarm-type manner, if threshold values for anomalous events are exceeded.

The system and method described by the present invention can be applied on a one-time basis, wherein the information about an engine that is gathered with the system is compared to standard information about such engines, or on a continuous basis wherein the information gathered about the engine is compared to stored information about the same engine collected at an earlier point in time. The present invention could be applied to engine analysis in a laboratory setting, a technical repair shop setting, or in an on-board analysis environment wherein constant monitoring of engine conditions is achieved.

BRIEF DESCRIPTION OF THE DRAWINGS

FIG. 2a is a detailed cross-sectional view of a first embodiment of a magnetostrictive sensor utilized in the apparatus of the present invention.

FIG. 2b is a bottom view of the magnetostrictive sensor shown in FIG. 2a.

FIG. 3a is a detailed cross-sectional view of a second embodiment of a magnetostrictive sensor utilized in the apparatus of the present invention.

FIG. 3b is a bottom view of the magnetostrictive sensor shown in FIG. 3a, as removed from the engine block.

FIG. 5 is a graphic representation of an output signal from the present invention displaying anomalous data.

DETAILED DESCRIPTION OF THE PREFERRED EMBODIMENT

As described above, the apparatus and method of the present invention can be implemented in a number of environments, depending upon the type of information to be gathered from the engine under analysis and the period of time over which such analysis is to occur. The apparatus of the present invention could be arranged in a laboratory setting or in a technical engine repair shop setting wherein access to the engine while operating is possible without motion of the automobile itself. In such a case, the elements and components of the present invention, as described in more detail below, could be positioned exterior to the vehicle itself and in a configuration more convenient for immediate data analysis.

This same set of invention components and elements, however, could be configured in a manner that allows their incorporation on board the vehicle with more limited display capabilities and yet with the same or similar analytical capabilities. The description that follows, therefore, is intended to be generic with respect to both of these applications as it should be well understood in the art how the underlying system could be structured for either on-board or external operation.

Figure 1:
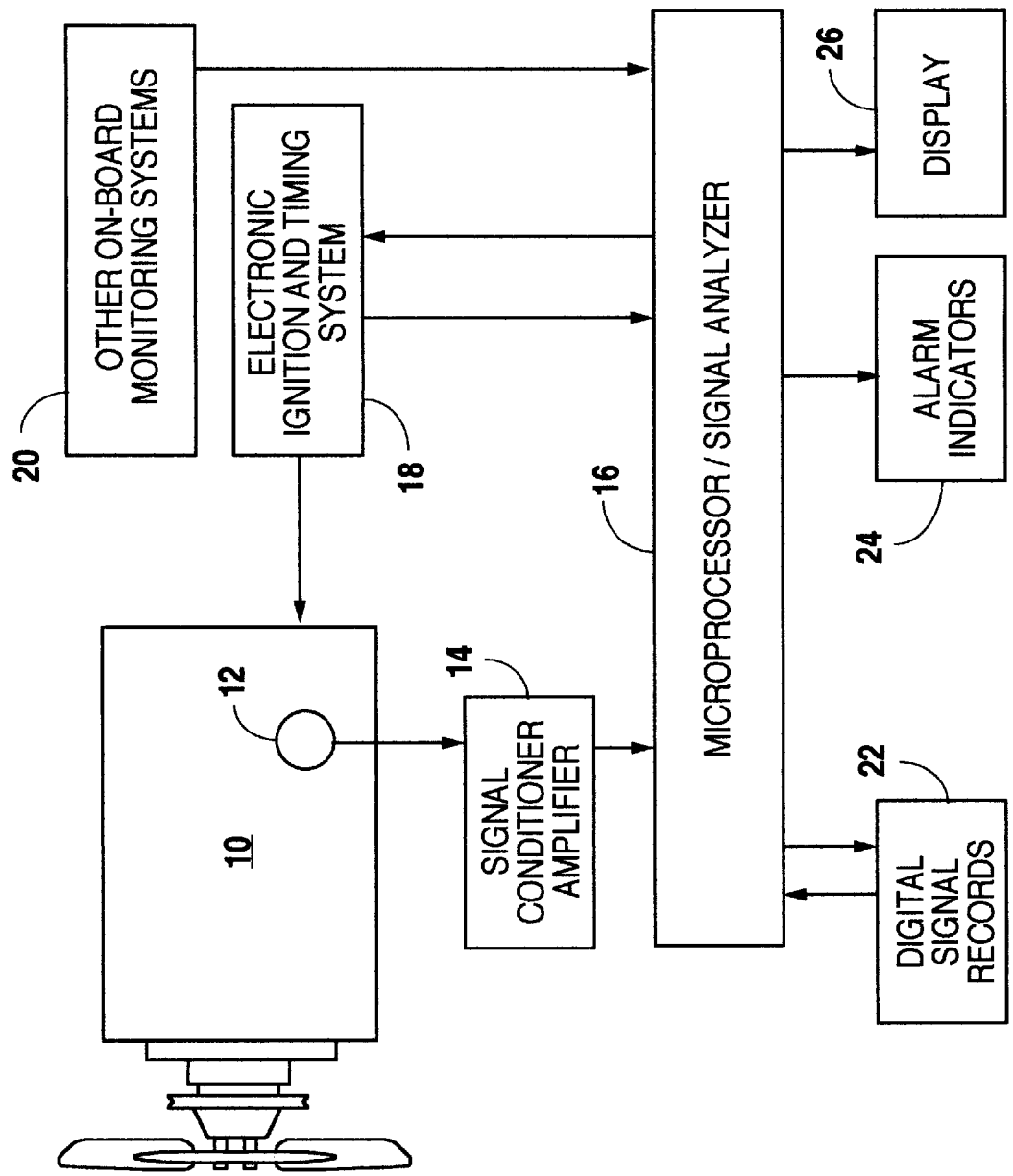
FIG. 1 is a schematic block diagram showing the primary elements of the apparatus of the present invention and their functional relationship.

Reference is first made, therefore, to FIG. 1 for an overview of the functional elements of the apparatus and, therefore, an overview of the method of the present invention. Mechanical stress waves within engine (10) are detected through the attachment of magnetostrictive sensor (MsS) (12) directly to engine (10), preferably on an external wall of the engine block, in a manner described in more detail below. Magnetostrictive sensor (12) detects the mechanical stress waves in the engine and conveys an electrical signal representative of these waves, away from engine (10) to signal conditioner/amplifier (14). Signal conditioner/amplifier (14) is comprised of standard electronic circuitry appropriate for amplifying (typically 20 to 40 db) and filtering the signal received from sensor (12) into a signal that can be digitized and analyzed by other components of the system.

The conditioned signal is then provided to microprocessor/signal analyzer (16) which is a microcomputerbased circuit capable of receiving, digitizing, and eventually storing the signal received from signal conditioner/amplifier (14). A number of the various functions associated with the system are incorporated in the programming of microprocessor/signal analyzer (16) but are considered standard and generally well known in the field of signal analysis and signal pattern recognition.

In addition to receiving the signal created by magnetostrictive sensor (12), microprocessor (16) receives information, primarily in the nature of engine timing and position information, from electronic ignition and timing system (18). Electronic ignition system (18) may appropriately be the standard electronic ignition circuitry commonly found on recently manufactured automobiles or may be retrofit timing sense devices that are well known in the field. The information from electronic ignition system (18) allows microprocessor/signal analyzer (16) to coordinate the information it receives from magnetostrictive sensor (12) with events as they are expected to occur within engine (10). Examples of these events include the firing of spark plugs and the position of various components within the engine such as the camshafts (and, therefore, the intake and exhaust valves), as well as the crankshaft. Information on the mechanical position of these critical engine elements may already be provided in factory-installed electronic ignition and timing system circuits or the engine may be retrofit with circuitry appropriate for deriving the timing sequence of the engine system and conveying it to microprocessor/signal analyzer (16).

In addition to engine timing, other on-board monitoring systems (20) provide microprocessor/signal analyzer (16) with additional information on the condition of the engine or the vehicle as a whole. Typical examples of other on-board monitoring systems (20) include coolant temperature sensors, exterior air temperature sensors, emission sensors, speed and acceleration sensors, intake manifold vacuum pressure sensors, drive train RPM transducers, and a number of other vehicle condition indicators.

Microprocessor/signal analyzer (16) accomplishes a number of different functions independently and in association with the various components of the system. A first primary function accomplished by microprocessor/signal analyzer (16) is the collection of data, as indicated above, by way of signal conditioner/amplifier (14), electronic and ignition timing system (18), and other on-board monitoring systems (20). With information received from each of these sources, microprocessor (16) is then capable of analyzing the engine signal received by way of magnetostrictive sensor (12), correlating the timing of the signal with timing information from electronic ignition and timing system (18) and, when appropriate, factoring in other engine vehicle conditions derived by other on-board monitoring systems (20). The only additional information required by microprocessor (16) is derived from digital signal records (22) which, as described in more detail below, serves as a memory component for microprocessor (16) and provides a database of previously-obtained or generated signal patterns that have already been associated with particular engine characteristics or with the condition of the specific engine at an earlier point in time. The connection between microprocessor (16) and digital signal records (22) is two-way in that previously-stored signal information can be recovered by microprocessor (16) for comparison with newly-acquired signal information and newly-acquired information can be stored for later recovery and use. Thus, digital signal records (22) would, in the preferred embodiment, be a bank of random-access-memory (RAM) or a combination of read-only-memory (ROM) and RAM.

The actual process of comparing the acquired signal with earlier recorded signals or with standard signal characteristics, involves the sequential process of identifying recognizable anomalies within the acquired signal. This process includes:

1. Identifying any pulse with an amplitude exceeding an expected preselected level; given value;

2. Determining, based upon timing information, whether a pulse is a normal engine event (valve closure, sparkplug firing, etc.);

3. If not a normal engine event, whether the identified anomalous pulse repeats; and if so, whether the repetition associated with a particular cylinder;

4. Determining whether the anomalous pulse, if repetitive, increases in amplitude over time;

5. Determining whether there are normal engine events missing from the acquired signature;

6. Determining whether the acquired signal pattern deviates from a recorded signal previously associated with the particular engine by greater than a pre-set deviation value;

7. Determining whether any time segment of the acquired signal matches a pattern associated with and previously identified as indicating a particular engine fault or deteriorating effect. (For example, a cracked line of the exhaust manifold creates a specific signal pattern immediately following a pulse indicative of a combustive event for a particular cylinder connected to that cracked exhaust line. Such a manifold pattern signal could be sufficiently distinctive in its character as to be identifiable regardless of which particular cylinder to which the cracked exhaust line is connected.

After comparing newly-acquired engine signals with previously-recorded engine signals or with standard engine signal characteristics, microprocessor (16) proceeds through a number of steps, depending upon the mode in which it is operating. In a monitoring mode, microprocessor (16) would compare engine signals with standard signal characteristics and determine if any of the characteristics exceed certain threshold values that might indicate alarm conditions in the engine. Typical examples of alarm conditions are described below in association with FIGS. 4 and 5. Should such a condition be determined to exist, microprocessor (16) would then signal alarm indicators (24) to notify the operator of the vehicle of the condition or at least of the existence of an anomaly that ought to be investigated further. Finally, microprocessor (16) is in communication with display (26) for the purpose of conveying either monitored information to the operator of the vehicle or conveying actual signal traces and signal information to a test engineer operating a one-time analysis of the engine condition. In the preferred embodiment display (26) is a video display terminal associated with microprocessor system (16) but could be an LCD display appropriate for positioning within the vehicle control panels for the environment where on-board monitoring is maintained.

Reference is now made to FIG. 2a for a more detailed description of the structure of a first preferred embodiment of magnetostrictive transducer (12) and its function as a stress wave detector. Sensor (32) is comprised primarily of permanent magnet (34), and coil (38) which is wound on a plastic bobbin (36). In the first preferred configuration shown in FIG. 2a, sensor (32) is a generally cylindrical device sized appropriate for placement in contact with an available surface area on engine block or head (30). Sensor (32) is attached to engine block or head (30) by either the normal magnetic forces derived from permanent magnet (34) or by mechanical clamping or fastening. The attachment method may depend upon the type and duration of the analysis for a particular engine.

Permanent magnet (34) is a generally cup-shaped cylinder having an internal void within which the combination of bobbin (36) and coil (38) may be snugly placed. This combination of bobbin (36) and coil (38) is set in place by potting the cup space using an adhesive material such as epoxy. Once constructed in this fashion, permanent magnet (34) and bobbin (36) present a smooth, flat surface that is held in direct mechanical contact with engine block or head (30). The windings of coil (38) terminate in wires that pass through an aperture in permanent magnet (34) to a top surface of sensor (32). At connector (40), a twisted pair of wires (42) carry the signal generated by magnetostrictive sensor (32) to the balance of the components of the system.

The magnetostrictive sensor (32) of the present invention shown in FIG. 2a functions by directing a static magnetic field generated by permanent magnet (34) into the ferromagnetic material comprising engine block or head (30). In the design shown in FIG. 2a, the magnetic field created by permanent magnet (34) extends from the north pole (N) indicated in the drawing to the south pole (S). The orientation of the north and south poles determines the direction of the magnetization in the engine block or head (30). Permanent magnet (34) should have a magnetization of a magnitude sufficient to create a magnetic field on the order of several Oersteds so that the magnetization of the material would be on the steep rising portion of the magnetization curve of the material. As stress waves pass through engine block (30), the mechanical motion of the engine block material within the static magnetic field induces changes in the magnetic field which, consequently, induce an electrical voltage in coil (38). This induced voltage is later interpreted by the balance of the components in the present invention.

Reference is now made to FIG. 2b for a detailed bottom view of the configuration of a first magnetostrictive sensor structure of the present invention. In FIG. 2b, it is seen that sensor (32), although generally cylindrical and cup-shaped, is structured as a partially split cylinder in order to magnetically accommodate the north (N) and south (S) poles of permanent magnet (34). Positioned within the central cup area of permanent magnet (34) and between the north (N) and south (S) poles of magnet (34) is coil (38), shown in shadow form in FIG. 2b and bobbin (36). This configuration has been determined to provide appropriate magnetic field strength for sensor (32). Typically, about 50 to 100 coil windings are sufficient.

Reference is now made to FIG. 3a for a description of an alternative sensor structure for the present invention. Rather than rely upon the magnetic strength of permanent magnet (34) or a mechanical clamping as described with FIG. 2a, an alternative embodiment of the magnetostrictive sensor involves bolting ferromagnetic stud (52) into position on engine block or head (30). This would entail tapping a hole with appropriate threading into engine block or head (30) at a moderate depth and positioning stud (52) where it is easily accessible for sensor placement. Sensor (50) itself could either be permanently attached to stud (52) or could be removable and positioned on stud (52) only when engine analysis is desired. Otherwise, the components of sensor (50) shown in FIG. 3a have elements analogous to those described above with regard to FIGS. 2a and 2b. Stud (52) is surrounded by a generally cylindrical core (54) that is comprised of permanent magnet (56), plates (58) and (60), and coil (62). This cylindrical core (54) is appropriately sized and configured to slide over ferromagnetic stud (52) and, because of permanent magnet (56), to remain adhered to stud (52) for the duration of analysis. If sensor (50) is to remain in place over an extended period of time or if the operation of the engine involves significant vibrations, cylindrical core (54) could be more permanently attached to stud (52) by way of an appropriate adhesive. The windings of coil (62) terminate at connector (64) which carries the electrical signal by way of wires (66) to the balance of the components of the present invention.

In this second sensor embodiment, permanent magnet (56) has a north (N)/south (S) configuration oriented as shown. This orientation creates an appropriately configured magnetic field through ferromagnetic material (52) and relies less upon the presence of ferromagnetic material in engine (30). This second sensor embodiment, therefore, would be appropriate for situations where an aluminum engine is present.

It should be noted that the magnetostrictive effect relies on the presence of ferromagnetic material but only within the vicinity of the static detection field initially created. As long as the mechanical stress waves can travel between the object of concern (the engine block here) and a ferromagnetic core of some type (stud (52) here), then the magnetostrictive effect can be utilized to measure and translate those stress waves into an electrical signal.

Reference is now made to FIG. 3b for a detailed description of a bottom view of the sensor described in FIG. 3a. Stud (52), with shoulder (53), can be seen concentrically surrounded by sensor cylinder (50). Coil (62) is seen with shadow lines behind plate (58). In this view the north pole (N) of permanent magnet (56) is positioned on all sides of the presented face of cylinder (50) with the south (S) pole being opposite and hidden in this view.

Figure 4:
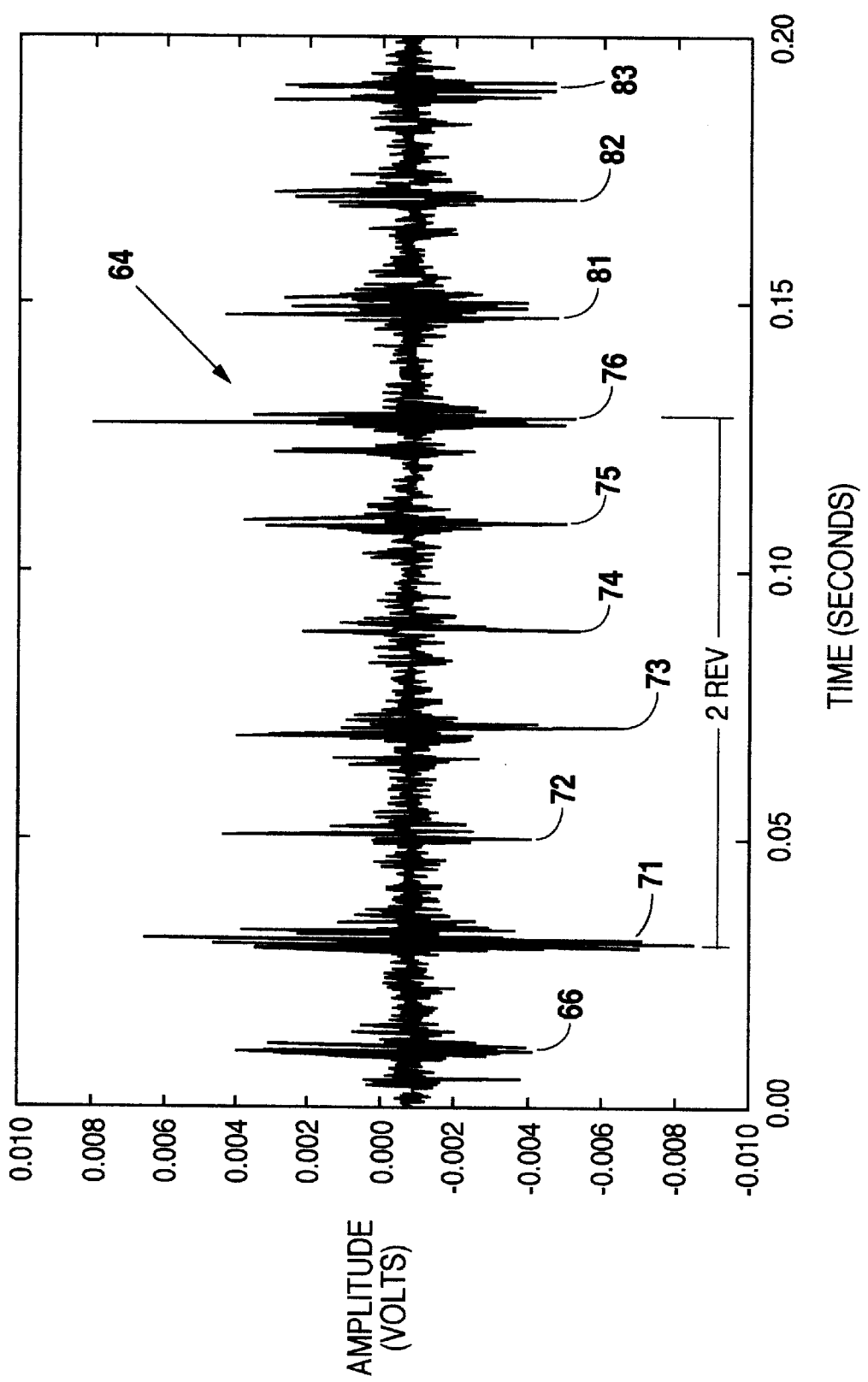
FIG. 4 is a graphic representation of a typical output signal generated by the apparatus and method of the present invention.

Reference is now made to FIG. 4 for a detailed description of a typical signal generated by the sensors described above and, thereafter, amplified and processed by the balance of the components of the present invention. Signal (64) in FIG. 4 is comprised of a time varying voltage with voltage units displaced on the Y axis and with time displaced on the X axis. The data in FIG. 4 was taken from a 4-stroke, 6-cylinder, diesel engine. In this graphic representation of standard signal (64) can be found a great deal of information about the characteristics of the engine under analysis. Immediately apparent are the significant signal amplitude increases at time intervals associated with the combustive firing of each cylinder of the engine. Some knowledge of the characteristics of the engine itself, that is the timing, the number of cylinders, the firing order, etc., allows some immediate interpretation of the signal. For signal (64) shown in FIG. 4, for example, peak (71) is known, by association with known electronic ignition and timing system information, to be the firing point of cylinder number 1 with subsequent firing points laid out according to the known firing order of the engine. Peak (72) in this example, therefore, would be cylinder 5, peak (73) cylinder 3, peak (74) cylinder 6, peak (75) cylinder 2, and peak (76) cylinder 4, of an in-line six-cylinder engine. It would then be known that peaks (71) and (81) represent repetitive events and generally could be described as a complete engine cycle which, in most cases, is the equivalent of two crankshaft revolutions. The time period, therefore, between peak (71) and (81) should be inversely related to the revolutions per minute of the engine.

A refined analysis of the peak and signal characteristics in standard signal (64) is generally required for a specific engine in order for more specific information to be acquired. The initial identification of a particular signal peak as an individual combustion or mechanical event within the engine might, in actuality, be a related event instead. An example of this can be seen from FIG. 4 where the highest peaks—(71), (72), (73), etc.—for signal (64), might initially be thought associated with the combustion event within each of the respective cylinders. Experimentation, however, has shown that the highest peaks associated with this signal are in fact intake valve closure events that are then immediately followed by the combustive events. It is, therefore, understood that a knowledge of the specific mechanical actions that occur within the engine, in addition to the timing of the combustive events, are important to an accurate analysis of the signal characteristics shown and detected by the magnetostrictive sensor.

The present invention achieves this identification and analysis in a combination of ways. First, for certain types of internal combustion engines, standard signal characteristics can be defined that apply across the board. These standards would include information on the number of cylinders, the specific timing of the firing of a first cylinder, and the sequence of the firing of each cylinder thereafter. With this knowledge, a broad "peak range" within the signal can be identified as including discrete peaks generated by a specific combustive event in a particular cylinder and/or the mechanical actions of engine elements associated with that combustive event.

Again, with reference to FIG. 4 and peak (71) therein, the collection of higher amplitude components of peak (71) can be shown by additional information on the engine to derive from a number of combustive activities associated with the first cylinder of the engine. Knowledge of the timing, firing sequence, number of cylinders, etc., allows derivation and identification of the balance of the peak ranges as described. Thereafter, peak (71) may be compared with peak (81) and subsequent signal features for the same cylinder.

Within the collection of higher amplitude peaks in "peak range" (71), discrete events can be distinguished by a knowledge of standard mechanical interactions in such internal combustion engines. Carrying further the example described above with regard to the intake valve closure, some knowledge of the timing between complete intake valve closure (i.e., the landing of the valve on the valve seat), the initiation of a spark through the spark plug and, thereafter, the combustive event, allow distinctions to be drawn between the individual peaks within peak range (71).

Many modern engines have multiple numbers of intake and exhaust valves associated with each cylinder, so the peak range characteristics will be determined by the actual mechanical construction of the engine and the specific moving mechanical parts associated with the firing of a particular cylinder. To some extent, these "standard" characteristics that are utilized by the present invention to interpret signal (64) are limited in that too detailed an analysis of the "standard" signal has the potential of covering over anomalous events occurring within the peak range.

For example, if a detailed standard analysis of the peak range amplitudes leads to a conclusion that a stress wave is always generated when the piston extends to its furthest point within the cylinder, and that it generates a relatively low amplitude signal indication, such standard characterization might cover over the occurrence of an anomalous event such as a ring fracture at the same point in time. It is desirable, therefore, in the pattern recognition programming of microprocessor/signal analyzer (16) for the present invention, not to create too many standard features in the signal in order to prevent the masking of anomalous events. With this in mind, however, a number of standard events can be characterized and used to facilitate a more thorough analysis of the signal.

It is more likely that valuable information will be derived from a comparison of an engine signal with baseline signals obtained prior to or earlier on in the deterioration of the engine. As an example, a baseline signal might be created at the time an automobile comes off the assembly line and in some manner be attached to or incorporated in the vehicle either through the use of an on-board memory device or a removable memory chip. Later analysis of the engine characteristics, therefore, would include comparison of a real time engine signal with the initial signature retained with the automobile. Changes in signal characteristics would, therefore, be indicative of both general deterioratory effects, and significant, individual anomalies that might indicate problems within the engine. These changes in signal characteristics could be as significant as the complete absence of a combustive event and, therefore, the complete disappearance of a signal peak for a specific cylinder signal range, or the differences could be more discrete, as with the occurrence of an out-of-place amplitude peak indicative of a sticking valve now landing in its seat out of timing with its previous signal.

Reference is now made to FIG. 5 for a more detailed description of the analysis of anomalous events and events which show up over the deteriorating lifetime of an engine. In FIG. 5, normal combustive events are reflected by peaks (94)–(97). The engine analyzed was a four-cylinder engine. In addition to the signals from normal combustion events, data (88) in FIG. 5 shows anomalous peaks (90) and (92) (after comparison with previous baseline signature signals) to be an exhaust line leak event associated with a particular cylinder. This determination is assisted by the modification of the exhaust valve closure event in its normal position immediately following the combustive event for a particular cylinder. Although the magnitude of the event and its overall timing would be relevant to a determination of its source, in this case it is critical that some other standard event expected by the microprocessor is modified or altered in its position within signal (88). The method of the present invention would, therefore, entail identifying which, if any, peaks within signal (88) are not present where expected, based upon a comparison with a signature signal, and which peaks appear where none are expected. The system can then identify the displacement of a particular signal, i.e., the absence of a signal at one spot and the presence of a signal at another, as possibly being a displaced mechanical event. Verification of this initial conclusion could be made by measuring the amplitude and duration of the signal event and comparing it with the expected amplitude and duration of the event in the signature signal.

Of course, a number of mechanical actions that do not normally occur in an engine can develop over time and create anomalies in the signal that are not associated with a simple displacement of an event. Cracks and internal fractures in the moving components of an engine can generate discrete stress waves as the fractures occur or as they interact with the combustive and mechanical events within the engine. Here again, repetition is an important factor in isolating the source of anomalous stress waves detected. Events that occur in association with activities surrounding a particular cylinder can generally be traced to the sequence of events from the intake manifold (or fuel injection) action through combustion, to the exhaust manifold action. After an event has been isolated to the sequence associated with a particular cylinder, the timing of the event within or about the "peak range" provides a basis for identifying the mechanical component that is likely the source of the anomalous stress wave. For example; an anomalous repetitive stress wave of moderate amplitude that is detected immediately after the exhaust valve closure (standard) event for the fourth cylinder, known not to be a valve generated stress wave because of the normal appearance of the valve closure event signal, is determined to be a crack in the exhaust manifold at a point adjacent to the fourth cylinder.

It is understood that a great number of "standard" events and identifiable "anomalous" events could be characterized and stored for identifying signal characteristics. The examples given in this above description are intended to be illustrative of such characterizations and not limiting of the capabilities of the apparatus and method of the present invention. The arrangement of analytical sensors and components of the present invention allow such characterizations to be made and to later be detected in a test environment or an on-board environment. It is expected that those skilled in the art will identify additional "standard" and identifiable "anomalous" events that would facilitate the analysis of the condition of an engine without departing from the scope of the present invention.

We claim:

1. An apparatus for sensing combustive and mechanical events occurring throughout an operating internal combustion engine through measurement of mechanical stress waves within the entire structural mass of said engine, the apparatus comprising:

a magnetostrictive sensor positioned in removable mechanical contact with said structural mass of said engine, said magnetostrictive sensor capable of detecting and translating said mechanical stress waves within said entire structural mass of said engine into a signal;

a signal conditioner for filtering and amplifying said signal from said magnetostrictive sensor:

means for identifying a positional condition of said operating internal combustion engine to facilitate identification of a source of said stress waves within said structural mass;

means for comparing said amplified signal with a recorded reference signal, said recorded reference signal representing an initial condition of said engine; and means for associating characteristic differences between said amplified signal and said reference signal with specific anomalous events within said engine, said characteristic differences being previously associated with such anomalous events.

2. The apparatus of claim 1 wherein said means for comparing said amplified signal with said recorded reference signal and said means for associating characteristic differences comprises a microprocessor and an analog to digital signal converter.

3. The apparatus of claim 1 wherein said magnetostrictive sensor comprises a permanent magnet and said removable mechanical contact comprises placement of said magnetic magnetostrictive sensor into contact with a ferromagnetic component of said engine.

4. The apparatus of claim 1 wherein said magnetostrictive sensor comprises a toroidal structure and said removable mechanical contact comprises bolting said toroidal structure to said structural mass of said engine.

5. A method for sensing combustive and mechanical events occurring throughout an operating internal combustion engine through measurement of mechanical stress waves present within the entire structural mass of said engine, comprising the steps of:

placing a magnetostrictive sensor in removable mechanical contact with said structural mass of said engine;

detecting and translating said mechanical stress waves from throughout said engine into a signal;

filtering and amplifying said signal;

identifying a positional condition of said operating internal combustion engine;

comparing said signal with a reference signal representing an initial condition of said engine;

identifying differences between said signal and said reference signal; and associating characteristic differences between said signal and said reference signal with specific anomalous events within said engine, said characteristic differences being previously associated with such anomalous events.

6. The method of claim 5 wherein said step of associating characteristic differences with specific anomalous events includes referencing said characteristic differences in time to said positional conditions of said operating engine.

7. The method of claim 5 wherein said step of associating characteristic differences with specific anomalous events includes analyzing said differences between said signal and said reference signal for frequency amplitude and time characteristics known to derive from specific anomalous engine events.

* * * * *